(No Model.)

H. PIEPER.
SECONDARY BATTERY.

No. 456,843. Patented July 28, 1891.

WITNESSES:

INVENTOR:
Henri Pieper,
By his Attorney,

UNITED STATES PATENT OFFICE.

HENRY PIEPER, OF LIEGE, BELGIUM.

SECONDARY BATTERY.

SPECIFICATION forming part of Letters Patent No. 456,843, dated July 28, 1891.

Application filed October 17, 1888. Serial No. 288,373. (No model.) Patented in Belgium February 10, 1888, No. 80,618, and in England February 10, 1888, No. 11,569.

*To all whom it may concern:*

Be it known that I, HENRY PIEPER, a subject of the King of Belgium, residing at Liege, in the Kingdom of Belgium, have invented new and useful Improvements in Galvanic Batteries, (for which I have obtained a Belgian Patent, No. 80,618, dated February 10, 1888, and a British Patent, No. 11,569, dated February 10, 1888,) of which the following is a specification.

The present invention relates to certain new and useful improvements in galvanic batteries, particularly secondary batteries or accumulators.

Figure 1:
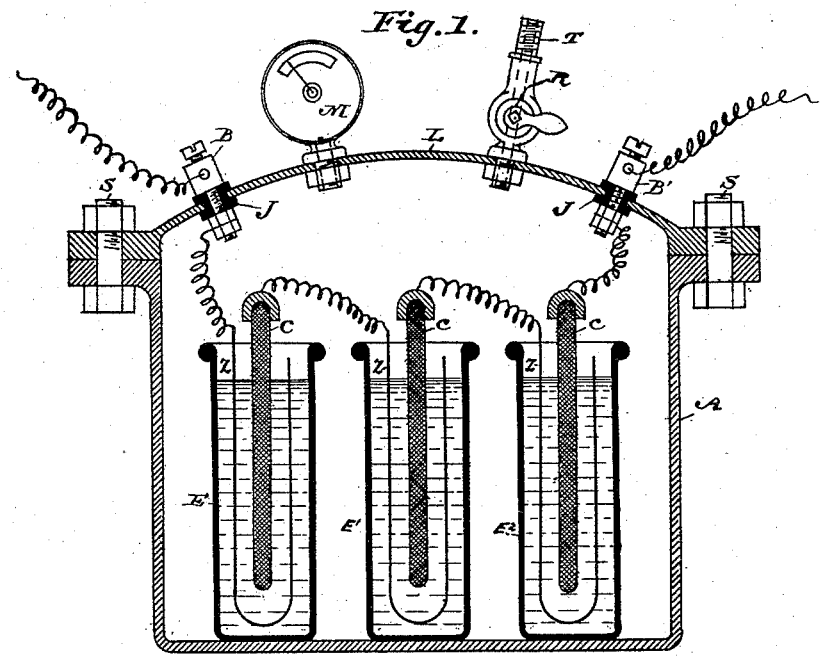
Figure 2:
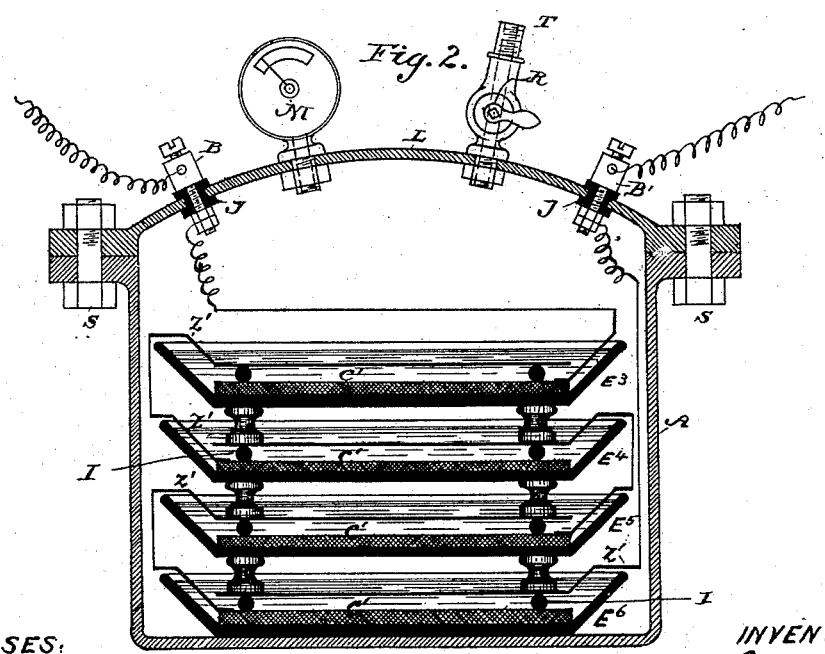

Figure 1 represents my invention as applied to a battery having vertical elements, and Fig. 2 represents my invention as applied to a battery having horizontal elements.

The purpose of the invention is to increase the capacity and efficiency of the electrolytic system, and this is effected by artificially increasing the opposing initial resistance to the chemical decompositions by means of which the work is to be stored up. This artificial resistance consists in a pressure considerably exceeding that of the atmosphere, which pressure is produced either before or during electrolysis and which is maintained constant. As a consequence of this procedure, the energy stored up in the primary and secondary batteries is made up of the sum of the initial work of the battery elements in the atmospheric medium plus the work which must be expended in order to neutralize the artificial resistance created. This increased internal pressure forms, furthermore, an obstacle to the abnormal re-combinations of the separated elements that give rise to the well-known parasite currents which it has been impossible to avoid in accummulators as heretofore organized and prepared. The increased pressure furthermore insures constancy, and where porous electrodes are used renders possible the storage of very considerable quantities of gases within said pores, either in a liquid-fluid condition or in an elastic-fluid condition.

The artificial resistance may be produced by compressing air in a space surrounding the batteries, or by completely filling the vessel containing the electrodes and hermetically sealing said vessel, in which event the gas developed in the liquid (which latter becomes but slightly or not at all compressed) finds no room for expansion and therefore produces the artificial resistance (pressure). The natural consequence of the artificial pressure produced in either of these ways is that the gases developed by the electrolytic action cannot escape at the electrodes, but are compelled to go over into the liquid condition as soon as the pressure is so great that it exceeds the pressure necessary to be exerted to liquefy said gases. In many cases the compressed gas dissolves in the liquid, whereby an active depolarization ensues, which partially favors all subsequent reactions.

Of all depolarizing gases gaseous chlorine, which becomes compressed to a liquid at a pressure of somewhat less than five atmospheres, is the best adapted to the purposes of my invention. Thus, for instance, a battery consisting of a zinc and a copper plate immersed in a zinc-chloride solution makes a very constant galvanic battery if the zinc-chloride solution contains chlorine in solution under pressure. From this battery I can obtain an accumulator in the following manner: In the bottom of the vessel I place a carbon plate and above it a zinc plate, the whole immersed in a zinc-chloride solution. This vessel is placed within an outer metallic or other vessel, which is hermetically sealed, and within which air is then compressed at a pressure higher than is essential to liquefy the chlorine—that is, somewhat under five atmospheres. I could, however, compress air direct in the vessel containing the electrodes. If now a current is passed from the carbon to the zinc, chlorine is given off at the carbon pole and metallic zinc is deposited upon the zinc plate. Since, however, the pressure of the air suffices to produce the direct liquefaction of the chlorine, it becomes liquid in proportion as it is generated and remains in contact with the carbon, provided that the concentration (specific gravity) of the zinc-chloride solution employed is less than that of the liquefied chlorine. On the other hand, the zinc plate could be placed beneath and the carbon plate above, in which case the specific gravity of the zinc-chloride solution employed must be greater than that of the liquefied chlorine, so that the latter floats on top.

A compound battery made up of several simple batteries or cells may be subjected to the action of compressed air within a single hermetically-sealed receptacle. All connections are made beforehand, and the two outermost poles are attached to two well-insulated buttons of the receptacle. A manometer upon the receptacle indicates constantly the pressure, which must never sink below that necessary for the liquefaction of the generated gas. In the drawings, Fig. 1 shows a vertical arrangement, and Fig. 2 a horizontal arrangement. In both figures, A indicates a metallic gas-tight vessel provided with a tightly-fitting lid L and containing air under pressure. B and B' indicate the battery-terminals insulated from the lid L by air-tight joints or nipples J, the lid itself being fastened down in place by the nuts and bolts S. A manometer M serves for observing the air-pressure within the vessel, and a pipe T, provided with a cock R, supplies the vessel with air under pressure. In Fig. 1 are shown a number of elements (three, for instance) E E' $E^2$, composed each of a vertical carbon plate C and a vertical zinc plate Z, arranged as shown and joined up in series. In Fig. 2 the elements are placed horizontally. Each element is, as before, composed of a carbon C', and a zinc Z', contained in the flat vessels $E^3$ $E^4$ $E^5$ $E^6$ of non-conductive material and arranged one above the other. Insulating-blocks I, of non-conductive material, are interposed between the carbon and zinc electrodes. The plates may be arranged horizontally or vertically. The reservoir with compressed air may be dispensed with entirely by hermetically closing the battery and filling it entirely with liquid, for in such case the gas freed at the electrode finds no room for expansion (because the liquid can only be compressed very slightly or not at all) and becomes liquid in proportion as it is generated. By conducting the electrolysis under pressure I can also obtain accumulators in which the gas generated present is not liquefied, but merely compressed.

I assume the accumulator to consist of two porous carbon electrodes, which are immersed in water acidulated, for instance, with sulphuric acid. If now I were to charge it in the open air, the liberated hydrogen and oxygen would escape at once into the air and the carbon plates would absorb only very little of either gas. If, however, I place this accumulator within a closed receptacle filled with air compressed under a pressure of, for instance, ten atmospheres, the gases can no longer escape, but become absorbed in notably increased quantity by the porous plates and only begin to escape from the latter when their pressure within the pores exceeds the external pressure—that is, that of the compressed air. In accordance with this method of procedure I can store up in a given electrode as much gas as I desire, provided only I permit the electrolysis to be completed in a vessel in which air may be kept compressed under an equivalent or higher pressure. As soon as the electrodes begin to allow gas to escape the charging is complete. If I thereupon increase the surrounding pressure, I can continue the charging until counterbalancing of the two pressures ensues, and so forth. The pressure in the batteries can also be modified by changing their temperature.

According as the electrolytic relationship of the compounds used varies, so varies also the pressure to be employed. Furthermore, said pressure varies in each separate case according to the chosen rate or standard of charging. Thus, for instance, I can maintain every electric charging constant by maintaining an equivalent or higher counter-pressure. Furthermore, I can regulate the rate to be observed in discharge by gradually diminishing the internal artificial pressure—that is, the obstacle opposing recombination.

Having thus described my invention, what I claim is—

1. The method of increasing the capacity of primary and secondary batteries and effecting their depolarization, which consists in maintaining within the battery-fluid gases in solution under pressure, substantially as described.

2. The method of preventing all evolution of free gas at the electrodes of secondary batteries, which consists in liquefying said gas within the battery by pressure as generated, whereby the greatest possible quantity of gas is compressed within the smallest possible space, substantially as described.

3. The method of maintaining in a battery gases in solution under pressure, which consists in maintaining above the surface of the battery-fluid a compressed body of air or other elastic fluid, substantially as described.

4. The method of maintaining in a compound battery made up of several cells, gases in solution under a uniform pressure in all the cells, which consists in maintaining above the surfaces of the battery-fluids of said cells a body of compressed air or other elastic fluid common to all, substantially as described.

5. The method of increasing the storage capacity of secondary-battery electrodes, which consists in subjecting the battery during the charging operation to external pressure until the gases generated enter in large quantities into the pores of the electrodes, either in a liquid-fluid condition or an elastic-fluid condition, substantially as described.

6. The method of maintaining constant the rate of charging secondary batteries, which consists in maintaining therein constantly a counter-pressure equivalent to or greater than that necessary to liquefy the gases as generated, substantially as described.

7. The method of regulating the rate of discharge of secondary batteries wherein gases are held in solution under pressure, which consists in gradually diminishing said pressure, thereby removing the obstacle to recombination to the extent desired, substantially as described.

In testimony whereof I have hereunto set my hand in the presence of two subscribing witnesses.

HENRY PIEPER.

Witnesses:
WM. S. PRESTON,
ERNEST MÜLLER.